United States Patent Office 3,792,147
Patented Feb. 12, 1974

3,792,147
USE OF COMPOSITIONS BASED ON DIORGANO-POLYSILOXANES WHICH CAN BE CURED AT ROOM TEMPERATURE TO GIVE ELASTOMERS, AS IMPRESSION COMPOSITIONS
Ernst Wohlfarth, Wolfgang Hechtl, Siegfried Nitzsche, and Paul Hittmair, Burghausen, Germany, assignors to Wacker Chemie G.m.b.H., Munich, Germany
No Drawing. Filed Feb. 10, 1972, Ser. No. 225,296
Claims priority, application Germany, Feb. 12, 1971, P 21 06 651.3
Int. Cl. B29c 1/02
U.S. Cl. 264—225   25 Claims

ABSTRACT OF THE DISCLOSURE

The compositions based on diorganopolysiloxanes, which can be cured at room temperature to give elastomers, which have hitherto been used, in known manner for the manufacture of moulds suffer from the disadvantage that they do not stay in place, that is to say that they run off vertical or inclined surfaces, if they are not prevented from so doing by means of shuttering, before they are cured and/or that the elastomers produced by curing these compositions cannot always be detached from surfaces which are rough or porous in such a way as not to damage the elastomer without the conjoint use of a release agent.

---

This invention provides impression compositions which stay in place, that is to say do not run off vertical or inclined surfaces, before curing, so that they can be used, even without shuttering, for taking an impression of, for example, plastic, figures or ornaments which form a part of the wall of a building and are more or less irremovably attached to this wall, or of vertical or inclined fracture surfaces of machine parts without previously dismantling these parts from the machine. The elastomers produced from the compositions according to the invention can, even without the conjoint use of a release agent, be easily detached from substrates of which an impression is to be taken and which possess porous or rough surfaces, such as, especially, sandstone and brick, concrete and plaster, that is to say natural and artificial stone.

The invention provides compositions which cure at room temperature to give elastomers and which comprise a diorganopolysiloxane, a crosslinking agent, a condensation catalyst, a reinforcing filler and a polyglycol, which may be etherified and/or esterified, as essential constituents, for use as impression compositions for the production of moulds.

As diorganopolysiloxanes it is possible to use, within the framework of the present invention, those curable diorganopolysiloxanes which are conventionally used in the manufacture of compositions based on diorganopolysiloxanes, crosslinking agents and condensation catalysts which cure at room temperature to give elastomers. The curable diorganopolysiloxanes which are generally used for the manufacture of such compositions and are also preferred for use in this invention are diorganopolysiloxanes which contain Si-bonded hydroxyl groups in the terminal units, and can be represented by the general formula

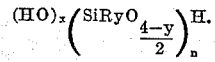

In this formula, R denotes a monovalent optionally substituted hydrocarbon radical, $x$ has an average value of 0.99 to 1.01, $y$ has an average value of 1.99 to 2.01, the sum of $x+y$ is 3 and $n$ is an integer having a value of at least 50. If desired, however, the Si-bonded hydroxyl groups can be partially replaced by other groups capable of condensation, such as oxime, alkoxy or alkoxyalkoxy, for example, $CH_3OCH_2CH_2O$, groups.

As is indicated, for example, by the average value of $y$ of 1.99 to 2.01, the diorganopolysiloxanes can, in addition to diorganopolysiloxane units, optionally contain small amounts of siloxane units of a different degree of substitution.

Examples of hydrocarbon radicals R are alkyl radicals, for example, methyl, ethyl, isopropyl and octadecyl radicals; alkenyl radicals, for example, vinyl and allyl radicals; cycloaliphatic hydrocarbon radicals, for example, cyclopentyl, cyclohexyl, cyclohexenyl and methylcyclohexyl radicals; aryl radicals, for example, phenyl and xenyl radicals; aralkyl radicals, for example, benzyl, beta-phenylethyl and beta-phenylpropyl radicals, and alkaryl radicals, for example, tolyl radicals.

Preferred substituted hydrocarbon radicals R are halogenoaryl radicals, for example chlorophenyl radicals; perfluoroalkylethyl radicals, for example the 3,3,3-trifluoropropyl radical, and cyanoalkyl radicals, for example the beta-cyanoethyl radical.

Preferably, because of easy accessibility, at least 50 percent of the number of R radicals are methyl radicals. The remaining radicals R which are optionally present are preferably phenyl and/or vinyl radicals.

The radicals R on the individual silicon atoms of the diorganopolysiloxanes can be identical or different. The diorganopolysiloxanes can be homopolymers, mixtures of different homopolymers, copolymers or mixtures of different copolymers, in each case of the same or different degrees of polymerization.

The viscosity of the diorganopolysiloxanes is appropriately 100 to 500,000 cp./25° C.

As crosslinking agents it is again possible to use, within the framework of the present invention, those crosslinking agents that are conventionally employed in the manufacture of compositions based on diorganopolysiloxanes, crosslinking agents and condensation catalysts which can be cured at room temperature to give elastomers. Because of easy accessibility, silicon compounds with at least three hydrocarbon radicals, especially alkyl radicals with 1 to 4 carbon atoms, bonded to silicon via oxygen, per molecule, are especially preferred as crosslinking agents. These are compounds which are preferably liquid at 20° C. and 760 mm. Hg, for example, hexaethoxydisiloxane, tetraethyl silicate, polyethyl silicate containing 40 percent by weight of $SiO_2$ (known under the name of "ethyl silicate 40") and 1,1,1-trimethyl - 3,3,3 - triethoxydisiloxane. Further examples of crosslinking agents are organopolysiloxanes with at least three Si-bonded hydrogen atoms per molecule, for example methylhydrogenopolysiloxanes.

The crosslinking agents are preferably used in amounts of 0.1 to 15 percent by weight, especially 0.5 to 5 percent by weight, based on the total weight of the composition.

As condensation catalyst it is again possible to use, within the framework of the present invention, those condensation catalysts that are conventionally employed in the manufacture of compositions, based on organopolysiloxanes, crosslinking agents and condensation catalysts, which can be cured at room temperature to give elastomers. Examples of such condensation catalysts are, especially, organic tin salts, for example, dibutyl-tin dilaurate and dibutyl-tin salts of aliphatic carboxylic acids which are branched in the alpha-position to the carboxyl group and possess 9 to 11 carbon atoms.

As reinforcing fillers, that is to say fillers having a surface area of more than 50 m.²/g., it is again possible to use, within the framework of the invention, all reinforcing fillers which it has hitherto been possible to employ for the manufacture of organopolysiloxane elastomers containing such fillers. Examples of such fillers are, especially, silicon dioxides produced pyrogenically in the gas phase, and also silicon dioxide aerogels and precipitated silicon dioxides of large surface area. However, if desired, other fillers having a surface area of more than 50 m.²/g. can also be employed instead of, or mixed with, silicon dioxide having a surface area of more than 50 m.²/g. Examples of such fillers are metal oxides, for example, titanium dioxide, ferric oxide, aluminium oxide and zinc oxide, provided they each have a surface area of at least 50 m.²/g. All these fillers can possess organosiloxy groups on their surface, for example as a result of treatment with trimethylmethoxysilane or hexamethyldisilazane, so that they are organophilic or hydrophobic.

In order that the compositions used according to the invention shall not run off vertical or inclined surfaces before curing, they must generally contain at least 3 percent by weight of reinforcing filler, based on the weight of organopolysiloxane, that is to say based on the total weight of their content of curable diorganopolysiloxane and any optionally added organopolysiloxane which, for example, acts as a plasticizer. In order that the compositions are not too difficult to process, they should not contain more than 60 percent by weight of reinforcing filler, based on their organopolysiloxane content. Because of easier processability of the compositions, a content of 3 to 30, preferably 3 to 15, percent by weight, based on the weight of organopolysiloxane, is preferred. It is particularly surprising that this relatively small content of reinforcing filler suffices to prevent the compositions running off vertical or inclined surfaces.

The polyglycols, which can be etherified and/or esterified, are well-known compounds. They are, however, new as constituents of compositions based on diorganopolysiloxanes which are used as impression compositions and can be cured at room temperature to give elastomers, and as constituents, not used as diluents for the condensation catalyst, of any compositions which can be cured at room temperature to give elastomers and contain less than 20 percent by weight of reinforcing fillers, based on the organopolysiloxane content of the compositions.

Excellent results are achieved with polyglycolethers, which have the advantage of being particularly easily accessible and which have the general formula $$RO[(CHR')_mO]_{n'}H$$

In this formula, R has the meaning given for it above, R' is hydrogen or an alkyl radical, $m$ is an integer having a value of 2 to 5 and $n'$ is an integer having a value of 2 to 100, preferably 4 to 50. Examples of hydrocarbon radicals R in the polyglycol-ethers of the above-mentioned formula are, apart from the examples of hydrocarbon radicals R which have already been mentioned above in relation to the diorganopolysiloxanes, lauryl, myristyl, cetyl, stearyl, oleyl, octylphenyl, nonyl, trimethylnonylphenyl, tributylphenyl and dodecylphenyl radicals. If R' is not hydrogen, it is preferably the methyl radical.

Examples of nonetherified and nonesterified polyglycols, that is to say compounds which can also be used according to the invention, are the polypropylene oxidepolyethylene oxide condensation products, known, for example, under the registered trademark "Pluronics."

The etherified and/or esterified polyglycols also include the organopolysiloxane-polyoxyalkylene copolymers. Examples of those copolymers are those formulae $$R_3Si[OSi(R)A]_pOSiR_3$$

$$A[OSi(R)A]_pOA$$

$$A(R)_2Si[OSi(R)A]_pOSi(R)_2A$$

wherein R in each case has the meaning given for it above, in most cases the methyl radical, $p$ is an integer having a value of 1 to 50 and the radicals A are in each case identical or different radicals of the general formula $$-[(CHR')_mO]_{n'}R''$$

wherein R', $m$ and $n'$ in each case have the meaning given for the above and R'' is hydrogen, a monovalent hydrocarbon radical, an acyl radical, a triorganosilyl radical, a diorgano-(hydrocarbon-oxy-silyl) radical, for example, the radical of the formula $$-Si(CH_3)_2OC_2H_5,$$

or the radical of the formula $$-[Si(R)AO]_pB$$

wherein A and R in each case have the meaning given for them above and B is $-SiR_3$ or A or $-Si(R)_2A$; and copolymers, especially block copolymers, of units of the general formula $-Si(R_2)O-$, wherein R has the meaning given for it above, and units of the general formula $$Si[(O)_aA]_bR_cO_{\frac{4-b-c}{2}}$$

wherein A and R in each case have the meaning given for them above, $a$ is 0 or 1, $b$ is 1, 2 or 3, $c$ is 0, 1 or 2 and the sum of $b+c$ is 1, 2 or 3, optionally together with units of the general formula $$R_{c'}(RO)_{b'}SiO_{\frac{4-c'-b'}{2}}$$

wherein R in each case has the meaning given for it above, $c'$ is 0, 1 or 3, $b'$ is 0, 1, 2 or 3 and the sum of $b'+c'$ is 0, 1, 2 or 3.

The hitherto best-known example of copolymers of the latter type is the compound of the formula $$C_2H_5Si\{O[Si(CH_3)_2O]_6(C_dH_{2d}O)_eC_4H_9\}_3$$

wherein $(C_dH_{2d}O)_e$ consists of about 17 oxyethylene units and about 13 oxypropylene units.

The polyglycol derivatives which are particularly preferred for use within the framework of the invention also belong to the latter type of copolymers and have the general formula $$A(R)_2Si[OSi(R)_2]_pOSi(R_2)A$$

The manufacture of organopolysiloxane-polyoxyalkylene copolymers is generally known. It can be effected, for example, by addition of an unsaturated polyglycol-ether to an organopolysiloxane containing Si-bonded hydrogen in the presence of a platinum catalyst.

The polyglycols, which can be etherified and/or esterified, are preferably employed in amounts of 0.5 to 30 percent by weight, especially 0.5 to 20 percent by weight, based on the weight of curable organopolysiloxane.

In preparing the compositions according to the invention, the polyglycols, which can be etherified and/or esterified, are preferably mixed with the diorganopolysiloxanes separately from the fillers and the condensation catalysts, for example because this requires the least effort.

In addition to the essential constituents, that is to say the diorganopolysiloxanes, crosslinking agents, condensation catalysts, reinforcing fillers and polyglycols, which can be etherified and/or esterified, the compositions according to the invention may contain further substances conventionally added as constituents of compositions, based on diorganopolysiloxanes and further substances, which can be cured to give elastomers. Examples of such substances are non-reinforcing fillers, pigments, soluble dyestuffs, organopolysiloxane resins, purely organic resins, such as polyvinyl chloride powder, corrosion inhibitors, scents, oxidation inhibitors, heat stabilizers and, in particular, plasticizers, especially inert organopolysiloxanes which are liquid at room temperature, for example, dimethylpolysiloxanes which are end-blocked by trimethylsiloxy groups. If plasticizers are used conjointly, they are preferably used in amounts of 5 to 70 percent by weight relative to the weight of the curable diorganopolysiloxanes. Examples of non-reinforcing fillers of surface area less than 50 m.²/g. are quartz powder, diatomaceous earth, calcium silicate, zirconium silicate, calcium carbonate of particle size above 4 microns and calcined aluminium silicate. Fibrous fillers, such as asbestoses, glass fibres and/or organic fibres, can also be used conjointly. Of course, mixtures of various reinforcing and/or non-reinforcing fillers can also be employed.

Because of their easily accessibility, it is prefered conjointly to use non-reinforcing fillers in amounts of 10 to 5,000 percent by weight relative to the weight of the reinforcing fillers.

In preparing the compositions according to the invention, all constituents of the compositions can in principle be used with one another in any desired sequence, in most cases at room temperature. However, if the compositions are employed more or less directly after being prepared, that is to say employed as so-called two-component systems, this being preferred, the crosslinking agents and condensation catalysts must only be mixed with the remaining constituents of the composition shortly before the compositions are used as impression compositions, in order to avoid premature curing. If plasticizers are used conjointly in the preparation of the compositions according to the invention, which can facilitate the use of the compositions, these plasticizers are preferably mixed with the curable organopolysiloxane before addition of the polyglycols, which can be etherified and/or esterified. Despite their plasticizer content, the compositions thus obtained surprisingly do not run off vertical or inclined surfaces before curing.

In the illustrative examples which follow, the compositions are tested for their resistance to running-off in accordance with the "Provisional Instructions for Testing Jointing Compositions in Prefabricated Concrete Construction" (July 1967 version, item 2.3, published in "Beton- und Stahlbau," 62nd year of publication, 1967, issue 9) by examining whether the compositions to be tested run out of a vertical rail before curing.

All parts and percentages quoted are by weight, unless otherwise stated.

Example 1

(a) 90 parts of a dimethylpolysiloxane possessing one Si-bonded hydroxyl group in each of the terminal units, of 90,000 cp./25° C., are first treated, in a mixing device, with 45 parts of a dimethylpolysiloxane, end-blocked with trimethylsiloxy groups, of 35 cp./25° C., then with 112.5 parts of quartz powder, then with 9 parts of silicon dioxide produced pyrogenically in the gas phase and finally with 7.5 parts of the organopolysiloxane-polyoxyalkylene block copolymer of the formula

$(CH_3)_2Si\{[OSi(CH_3)_2]_5OSi(CH_3)_2(CH_2)_3$
$(OCH_2CH_2)_6OSi(CH_3)_2OC_2H_5\}_2$

The paste thus obtained, which proves not to run off in the above-mentioned test, is mixed with 4% of its weight of a mixture of 3 parts by volume of hexaethoxydisiloxane and 1 part by volume of dibutyl-tin dilaurate. The composition thus obtained is supple, proves not to run off in the above test, and cures on bricks and sandstone to give elastomers which can easily be detached from these surfaces and are very accurate negative moulds of the surfaces on which they have been produced.

(b) The measures described above under (a) are repeated, for comparison, with the exception that the polyglycol derivative is not added. The paste obtained after mixing the curable diorganopolysiloxane, plasticizer, non-reinforcing filler and reinforcing filler, when tested for its running-off characteristics, runs out of the rail to some extent even before mixing with the crosslinking agent and condensation catalyst and is even less resistant to running-off after mixing with the crosslinking agent and condensation catalyst. The elastomers produced from the composition on bricks and sandstone cannot be detached from these without damaging the elastomers.

Example 2

100 parts of a dimethylpolysiloxane possessing one Sil-bonded hydroxyl group in each of the terminal units, of 19,300 cp./25° C., are first treated, in a mixing device, with 10 parts of silicon dioxide produced pyrogenically in the gas phase, and finally with 10 parts of a tributylphenol which has been etherified with a polyethylene glycol of 13 ethylene oxide units.

The paste thus obtained is mixed with 4% of its weight of a mixture of 3 parts by volume of hexaethoxydisiloxane and 1 part by volume of dibutyl-tin dilaurate. The composition thus obtained is supple, proves not to run off in the abovementioned test and cures on bricks and sandstone to give elastomers which can easily be detached from the surface and represent very accurate negative moulds of the surfaces on which they have been produced.

Example 3

(a) 75 parts of a dimethylpolysiloxane, possessing one Si-bonded hydroxyl group in each of the terminal units, of 19,300 cp./25° C. is first treated, in a mixing device, with 25 parts of a dimethylpolysiloxane, end-blocked with trimethylsiloxy groups, of 35 cp./25° C., then with 25 parts of silicon dioxide which has been produced pyrogenically in the gas phase and possesses trimethylsiloxy groups on its surface, that is to say which has been rendered hydrophobic, and finally with 6.25 parts of tributylphenol which has been etherified with a polyethylene glycol of 13 ethylene oxide units.

The paste thus obtained, which proves not to run off in the above-mentioned test, is mixed with 4% of its weight of a mixture of 3 parts by volume of hexaethoxydisiloxane and 1 part by volume of dibutyl-tin dilaurate. The composition thus obtained is supple, proves not to run off in the above-mentioned test and cures on sandstone and bricks to give elastomers which can easily be detached from the surface and represent very accurate negative moulds of the surfaces on which they have been produced.

(b) The measures described above under (a) are repeated with the modification that no polyglycol derivative is used. The composition thus obtained is not resistant to running-off and the elastomers produced from this composition on bricks and sandstone cannot be detached without damaging the elastomers.

What is claimed is:

1. An improved process for the production of impression moulds from room temperature vulcanizable organopolysiloxanes, which comprises applying an impression composition containing a diorganoopolysiloxane represented by the general formula

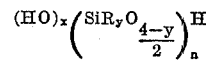

$$(HO)_x \left( SiR_yO_{\frac{4-y}{2}} \right)_n H$$

in which R is selected from the group consisting of a monovalent hydrocarbon radical, a halogenated monovalent hydrocarbon radical and a cyanoalkyl radical, $x$ has an average value of 0.99 to 1.01, an average value of 1.99 to 2.01, the sum of $x+y$ is 3 and $n$ is an integer having a value of at least 50, from 0.1 to about 15 percent by weight based on the total weight of the composition of a cross-linking agent which is a liquid at a temperature of 20° C. at 760 mm. Hg., selected from the group consisting of silicon compounds having at least 3 hydrocarbon radicals bonded to silicon via oxygen per molecule and organopolysiloxanes having at least 3 Si-bonded hydrogen atoms per molecule, a condensation catalyst and from 3 to 60 percent by weight based on the organopolysiloxane content of a reinforcing filler having a surface area of more than 50 m.²/g. to a pattern surface, curing the composition at room-temperature to form an elastomer and thereafter removing the elastomer from the pattern surface to form a negative mould thereof, the improvement which comprises adding from 0.5 to 30 percent by weight based on the weight of the curable organopolysiloxane of a polyglycol to said impression composition, said polyglycol is selected from the group consisting of polyglycol ethers having the general formula $$RO[(CHR')_mO]_{n'}H$$

in which R is selected from the group consisting of a monovalent hydrocarbon radical, a halogenated monovalent hydrocarbon radical and a cyanoalkyl radical, R' is selected from the group consisting of hydrogen and an alkyl radical, $m$ is an integer having a value of 2 to 5 and $n'$ is an integer having a value of 2 to 100; polypropylene oxide-polyethylene oxide condensation products; organopolysiloxane-polyoxyalkylene copolymers having the general formula $R_3Si[OSi(R)A]_pOSiR_3$, $A[OSi(R)A]_pOA$, $$A(R)_2Si[OSi(R)_2]_pOSi(R)_2A$$

$$A(R_2Si[OSi(R)A]_pOSi(R)_2A$$

in which R is the same as above, $p$ is an integer having a value of 1 to 50 and A is a radical of the general formula $$[(CHR')_mO]_{n'}R''$$

where R', $m$ and $n'$ are the same as above, R'' is selected from the group consisting of hydrogen, a monovalent hydrocarbon radical, an acyl radical, a triorganosilyl radical, a diorgano-(hydrocarbon-oxysilyl) radical, a radical having the general formula $-[Si(R)AO]_nB$ and copolymers which contain units of the formula $$Si(R)_2O$$

$$Si[(O)_aA]_bR_cO_{\frac{4-b-c}{2}}$$

and $$R_{c'}(RO)_{b'}SiO_{\frac{4-c'-b'}{2}}$$

where R, A and $p$ are the same as above and B is selected from the group consisting of $-SiR_3$, A and $-Si(R)_2A$; $a$ is 0 to 1, $b$ is 1 to 3, $c$ is 0 to 2, the sume of $b+c$ is from 1 to 3, $b'$ is 0 to 3, $c'$ is 0 to 1 and 3 and the sum of $b'+c'$ is 0 to 3.

2. The process of claim 1 wherein the dioragnopolysiloxane is a mixture of diorganopolysiloxanes in which some of the Si-bonded hydroxyl groups of the diorganopolysiloxanes have been replaced by groups selected from the class consisting of oximo, alkoxy and alkoxyalkoxy radicals.

3. The process of claim 1 wherein the hydrocarbon radicals R are selected from the group consisting of alkenyl radicals, cycloaliphatic radicals, aryl radicals, aralkyl radicals and alkaryl radicals.

4. The process of claim 1 wherein the halogenated hydrocarbon radicals R are selected from the group consisting of halogenoaryl radicals and perfluoroalkylethyl radicals.

5. The process of claim 1 wherein at least 50 percent of the number of radicals R are methyl radicals.

6. The process of claim 5 wherein any remaining radicals R are selected from the group consisting of phenyl and vinyl radicals.

7. The process of claim 1 wherein the diorganopolysiloxane has a viscosity of from 100 to 500,000 cp./25° C.

8. The process of claim 1 wherein the cross-linking agent is a silicon compound containing at least 3 hydrocarbon radicals per molecule bonded to silicon via oxygen.

9. The process of claim 1 wherein the cross-linking agent is an organopolysiloxane containing at least 3 Si-bonded hydrogen atoms per molecule.

10. The process of claim 1 wherein the cross-linking agent is present in an amount of from 0.5 to 5 percent by weight based on the total weight of the composition.

11. The process of claim 1 wherein the condensation catalyst is an organic tin salt.

12. The process of claim 1 wherein the reinforcing filler is selected from the group consisting of a silicon dioxide produced pyrogenically in the gas phase, a silicon dioxide aerogel and a precipitated silicon dioxide.

13. The process of claim 1 wherein the reinforcing filler is present in an amount of from 3 to 30 percent by weight calculated on the organopolysiloxane content.

14. The process of claim 13 wherein the reinforcing filler is present in an amount of from 3 to 15 percent by weight calculated on the organopolysiloxane content.

15. The process of claim 13 wherein R' is a methyl radical.

16. The process of claim 1 wherein the polyglycol component is a polypropylene oxide-polyethylene oxide condensation product.

17. The process of claim 1 wherein the polyglycol component is an organopolysiloxane-polyoxyalkylene copolymer.

18. The process of claim 1 wherein the polyglycol component is present in an amount of from 0.5 to 20 percent by weight calculated on the weight of curable organopolysiloxane.

19. The process of claim 1 which also contains an inert organopolysiloxane plasticizer which is liquid at room temperature.

20. The process of claim 19 wherein the plasticizer is present in an amount of from 5 to 70 percent by weight calculated on the weight of diorganopolysiloxane.

21. The process of claim 1 which also includes a non-reinforcing filler.

22. The process of claim 21 wherein the non-reinforcing filler is used in an amount of from 10 to 5,000 percent by weight calculated on the weight of reinforcing filler.

23. The process of clam 1 wherein the polyglycol component is a polyglycol ether of the general formula $$RO[(CHR')_mO]_{n'}H$$

wherein R is selected from the group consisting of a monovalent hydrocarbon radical, a halogenated monovalent hydrocarbon radical and a cyanoalkyl radical and R' is selected from the group consisting of hydrogen and an alkyl radical, $m$ is an integer having a value of 2 to 5 and $n'$ is an integer having a value of 2 to 100.

24. The process of claim 23 wherein $n'$ has a value of 4 to 50.

25. The process of claim 24 wherein the polyglycol component is a copolymer of the general formula $$A(R)_2Si[OSi(R)_2]_pOSi(R)_2A$$

wherein R is selected from the group consisting of monovalent hydrocarbon radical, a halogenated monovalent hydrocarbon radical and a cyanoalkyl radical, $p$ is an integer having a value of 1 to 50 and A is a radical of the general formula $$[(CHR')_mO]_{n'}R''$$

wherein R' is selected from the group consisting of hydrogen and an alkyl radical, $m$ is an integer having a value of 2 to 5 and $n'$ is an integer having a value of 2 to 100 and R'' is selected from the group consisting of hydrogen, a monovalent hydrocarbon radical, an acyl radical, a triorganosilyl radical, a diorgano-(hydrocarbonoxysilyl) radical, or the radical of the formula $$[Si(R)A]_pB$$

wherein R, A and $p$ have the meaning given above and B is selected from the group consisting of $-SiR_3$, A and $-Si(R)_2A$.

References Cited

UNITED STATES PATENTS 3,677,996 7/1972 Kaiser et al. _____ 260—37SB X
3,324,058 6/1967 Scott _____ 260—37SB X LEWIS T. JACOBS, Primary Examiner U.S. Cl. X.R.

260—37SB